United States Patent [19]

Kin et al.

[11] Patent Number: 5,424,714
[45] Date of Patent: Jun. 13, 1995

[54] HYDROPLANING DETECTING SYSTEM

[75] Inventors: Keiyu Kin; Shuji Shiraishi, both of Wako, Japan

[73] Assignee: Honda Giken Kogyo Kabushiki Kaisha, Haga, Japan

[21] Appl. No.: 961,270

[22] Filed: Oct. 16, 1992

[30] Foreign Application Priority Data

Oct. 16, 1991 [JP] Japan .................... 3-267579

[51] Int. Cl.6 .................... B60Q 1/00; G06F 7/70
[52] U.S. Cl. .................... 340/438; 340/439; 340/441; 340/670; 180/170; 180/197; 180/271; 280/734; 280/735; 364/426.01; 364/426.02
[58] Field of Search ............ 340/438, 439, 441, 670; 180/170, 171, 197, 271; 280/734, 735; 364/426.01, 426.02, 426.03, 426.04

[56] References Cited

U.S. PATENT DOCUMENTS

| | | | |
|---|---|---|---|
| 4,070,562 | 1/1978 | Kuno et al. | 340/438 |
| 4,233,599 | 11/1980 | Brearley | 340/438 |
| 4,419,654 | 12/1983 | Funk | 340/438 |
| 4,545,240 | 10/1985 | Leiber | 340/438 |
| 4,583,173 | 4/1986 | Odlen et al. | 340/438 |
| 5,032,821 | 7/1991 | Domanico et al. | 340/438 |

Primary Examiner—Donnie L. Crosland
Attorney, Agent, or Firm—Armstrong, Westerman, Hattori, McLeland & Naughton

[57] ABSTRACT

A hydroplaning detecting system comprises wheel rotational speed detecting apparatus for detecting a wheel rotational speed of a wheel of a vehicle, reference pattern storage apparatus for previously storing a reference pattern of wheel rotational speed which varies over a period of time and is characteristic of hydroplaning generation, actual variation pattern extracting apparatus for extracting a actual variation in the wheel rotational speed over a period of time, and judgment apparatus for judging the matching between the reference pattern and the actual variation pattern. Thus, this hydroplaning detecting system is capable of accurately detecting the generation of hydroplaning.

14 Claims, 13 Drawing Sheets

RIDING OVER PROTRUSION, PASSING ON STEP

EXTRACTION →

FIG.6D

OTHER COURSES

EXTRACTION →

FIG.6E

REFERENCE PATTERN

FIG. 7C $k=1,2,3\cdots,n$

HYDROPLANING DETECTING SYSTEM

BACKGROUND OF THE INVENTION

1. Field of the Invention

The field of the present invention relates to a hydroplaning detecting system for detecting a hydroplaning phenomenon generated when a vehicle travels over a sheet of water on a road surface at a high speed.

2. Description of the Related Art

The term "hydroplaning phenomenon" refers to a phenomenon that occurs when the vehicle travels over a water screen such as a puddle at a high speed (in general, at least 80 km/hr), in which a wheel is temporarily lifted up from the road surface, and the friction coefficient between the wheel and the road surface is rapidly reduced. The hydroplaning results when the water screen enters into a wedge-shaped space between the road surface and the wheel at high speed, thereby permitting the wheel to be urged away from the road surface by the dynamic pressure of the water screen.

Figure 5:
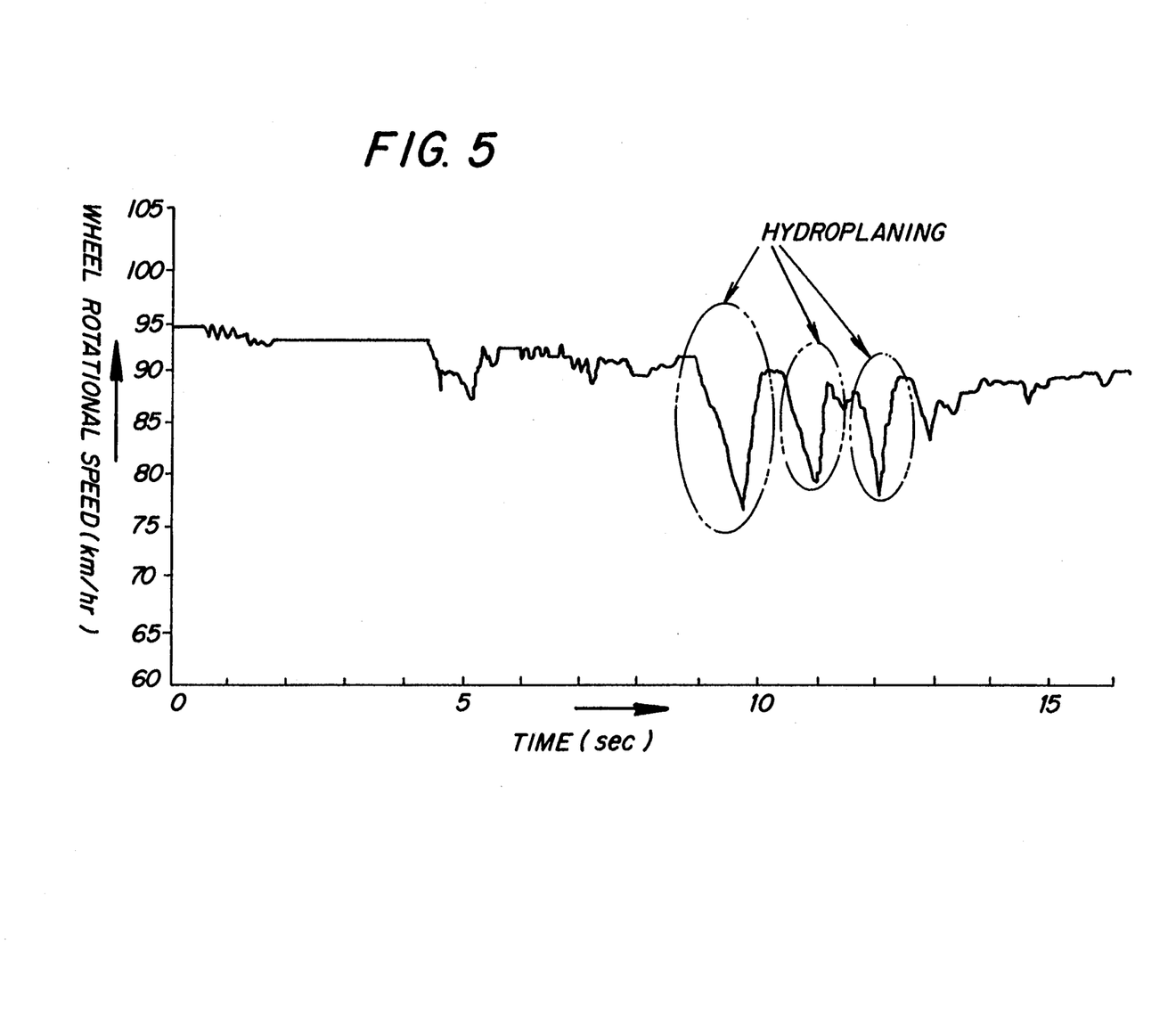
FIG. 5 is a graph illustrating the variations in follower speed and yaw rate with time, when the hydroplaning is generated.
Figure 6A:
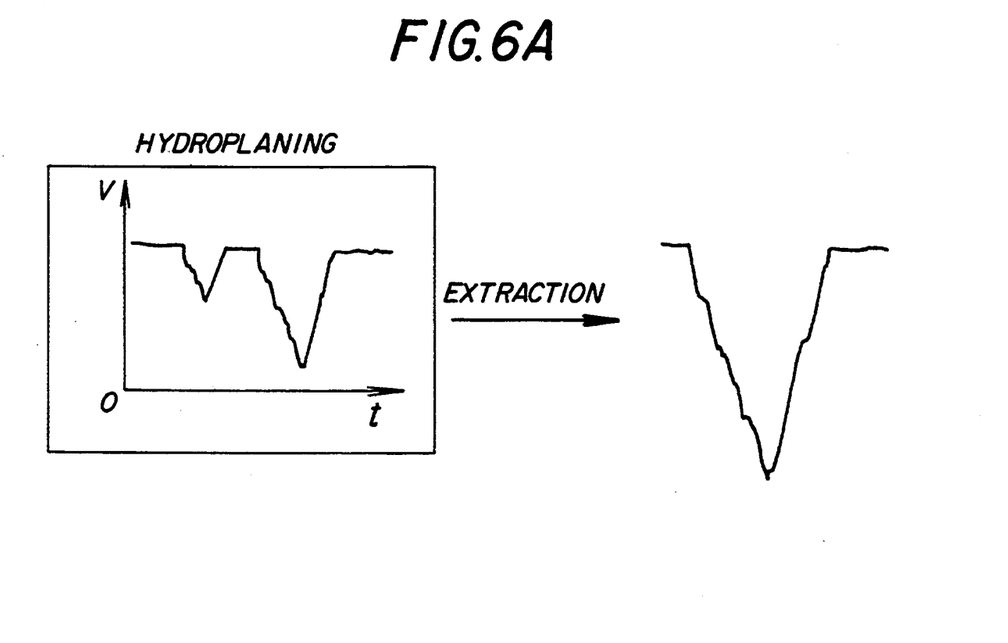
FIGS. 6A to 6E are diagrams of various patterns of follower wheel speed.
Figure 6B:
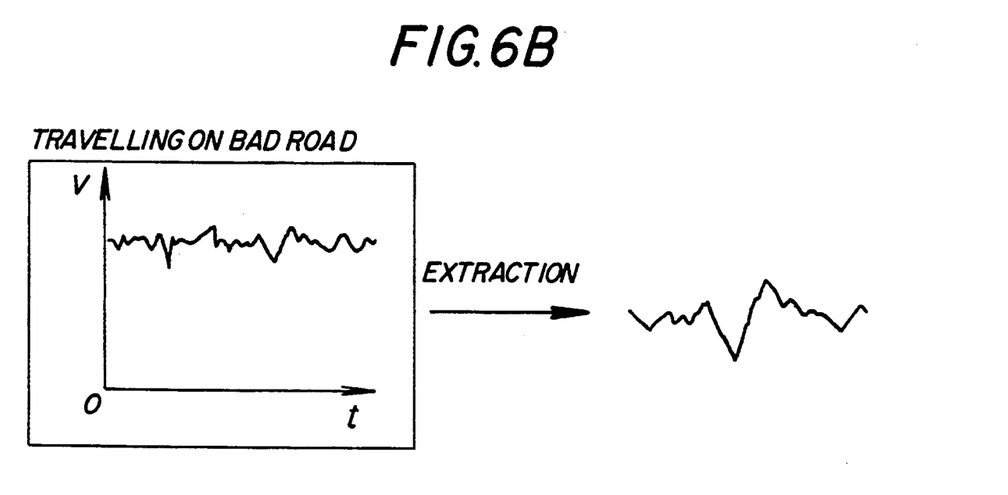
Figure 6C:
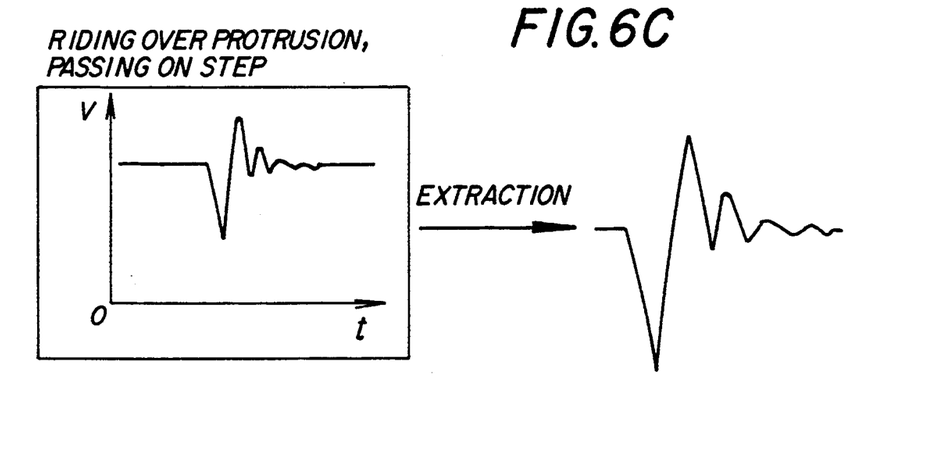
Figure 6D:
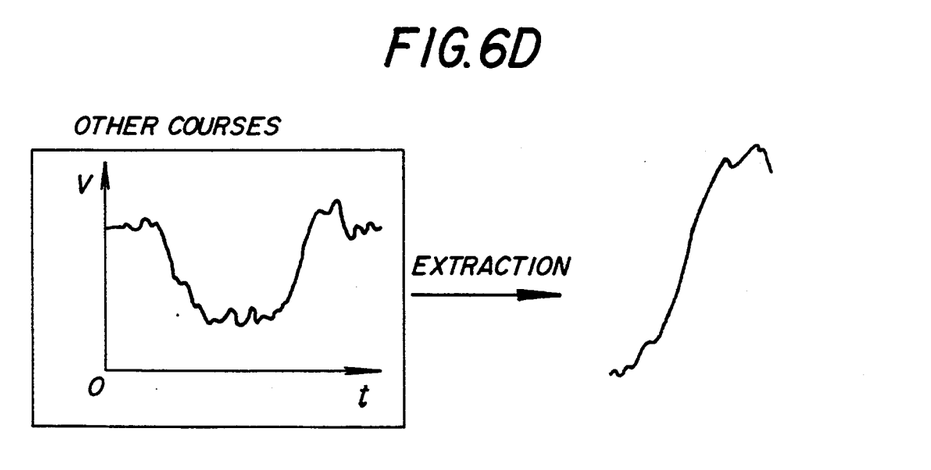
Figure 6E:
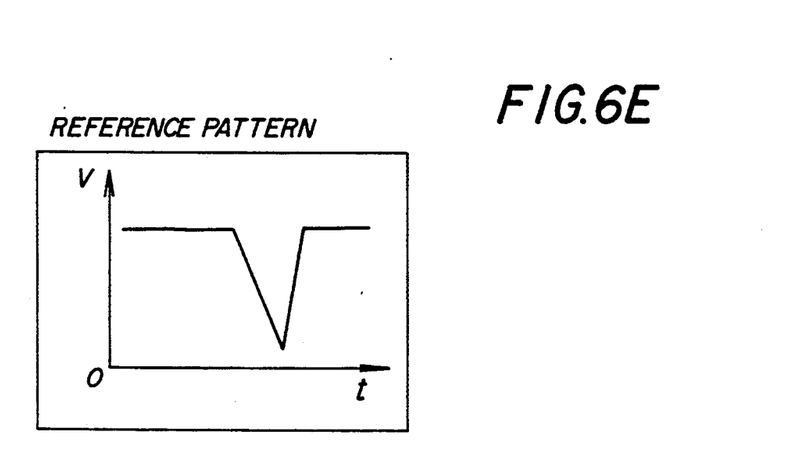

As shown in FIG. 5, hydroplaning is generated within an extremely short time, much less than 1 second and, during this time, the rotational speed of the wheel is reduced rapidly and then restored instantaneously. Specifically, when the wheel is lifted up from the road surface, the wheel is rapidly reduced in rotational speed (in general, by at least several km/hr) by the resistance of the water screen entering between the wheel and the road surface. The wheel then contacts with the road surface again, and as a result, the original speed is restored. Thus, the pattern of speed in this case has a shape of a downwardly indented wave. When the water screen extends along the road surface through a long distance, such hydroplaning may be generated in a repeated manner at short time intervals, and during this time, braking and steering performances may be affected.

A conventionally known hydroplaning detecting technique is based on rapid indented wave-like reduction in rotational speed of the wheel for detection of the generation of the hydroplaning, such as when the magnitude of a deceleration obtained by differentiation of the rotational speed of the wheel exceeds a reference value, as described, for example, in Japanese Patent Application Laid-open No. 265172/88.

However, the rapid reduction in rotational speed of the wheel of the vehicle is generated not only when the hydroplaning phenomenon is produced, but also in other cases, for example, such as when the vehicle travels on a bad road, or when a wheel rides over a protrusion or a step on a road surface (see FIGS. 6A to 6D). For this reason, with the above prior art technique using a differentiated value of the rotational speed of the wheel, it is difficult to reliably distinguish a deceleration of the wheel due to hydroplaning from a deceleration of the wheel due to other causes, and the accuracy of detection, therefore, has a limit.

SUMMARY OF THE INVENTION

Accordingly, it is an object of the present invention to provide a hydroplaning detecting system which is capable of detecting the generation of a hydroplaning with high accuracy.

To achieve the above object, according to the present invention, there is provided a hydroplaning detecting system comprising wheel rotational speed detecting means for detecting the wheel rotational speed of a wheel of a vehicle, reference pattern storage means for storing a reference variation pattern of the wheel rotational speed which includes a pair of descending portion and ascending portion over a period of time and is characteristic of hydroplaning generation, actual variation pattern extracting means for extracting an actual variation in the wheel rotational speed over a period of time, and judgment means for judging a matching between the reference pattern and the actual variation pattern, and for producing an output signal indicative of hydroplaning generation when the matching is detected.

With the above-described features of the present invention, it is possible to accurately distinguish a variation in wheel rotational speed produced due to the generation of hydroplaning from a variation in wheel rotational speed produced when the vehicle travels on a bad road, or when a wheel rides onto a step, thereby reliably detecting the generation of hydroplaning.

In addition to the above features of the present invention, if the judgment means includes an inner product calculating means for calculating an inner product between the reference pattern and the actual variation pattern, and a comparator means for comparing the calculated inner product with a reference value previously stored in a reference value storage means, it is possible to detect the generation of the hydroplaning more accurately.

In addition to the above features of the present invention, if the judgment means includes convolution integrating means for conducting a convolution integration between the reference pattern and the actual variation pattern, and a comparator means for comparing the integrated value with a reference value previously stored in a reference value storage means, it is possible to detect the generation of the hydroplaning more accurately.

Further, in addition to the above-mentioned features of the present invention, if the actual variation pattern extracting means includes a waveform extracting means for extracting the waveform of an actual variation in detected wheel rotational speed, and a normalizing means for normalizing a high value of a speed-reduction peak wave in the extracted waveform with a high value of a speed-reduction peak wave of said reference pattern, it is possible to improve the accuracy of pattern matching between the actual variation pattern and the reference pattern.

Yet further, in addition to the above features of the present invention, if the system includes alarm means for giving an alarm for the generation of a hydroplaning on the basis of an output from the judgment means, the alarm means is operated when the hydroplaning is detected and therefore, it is possible for a driver to take a step, for example, immediately reduce the travel speed, thereby avoiding the subsequent generation of the hydroplaning.

The above and other objects, features and advantages of the invention will become apparent from the following description of the preferred embodiments, taken in conjunction with the accompanying drawings.

BRIEF DESCRIPTION OF THE DRAWINGS

The drawings illustrate preferred embodiments of the present invention, wherein.

DESCRIPTION OF THE PREFERRED EMBODIMENTS

The present invention will now be described by way of preferred embodiments in connection with the accompanying drawings.

FIGS. 1 to 7E illustrate a first embodiment of the present invention.

Figure 1:
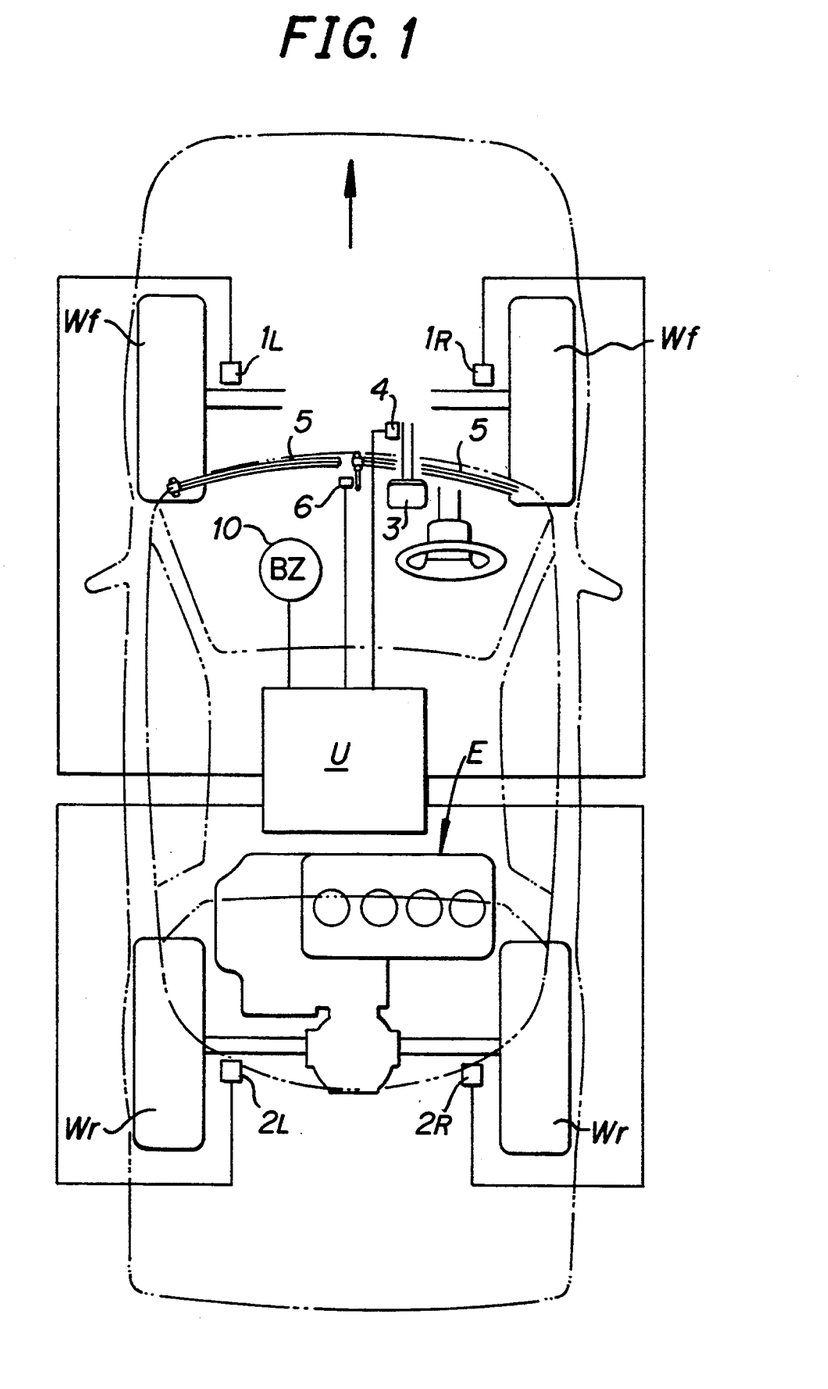
FIG. 1 is a schematic illustration of a vehicle equipped with a hydroplaning detecting system according to a first embodiment of the present invention.

Referring to FIG. 1, a vehicle comprises left and right front wheels Wf as follower wheels, and left and right rear wheels Wr as driving wheels driven by an engine E. The left and right front wheels Wf have follower wheel speed sensors $1_L$ and $1_R$ provided thereon for detecting the rotational speeds thereof, respectively, and the left and right rear wheels Wr have driving wheel speed sensors $2_L$ and $2_R$ provided thereon for detecting the rotational speeds thereof, respectively. A brake pedal 3 is provided with a brake switch 4 adapted to be turned ON in a non-braking condition, and a wiper 5 is provided with a wiper switch 6 adapted to be turned ON when the wiper 5 is to be used. The follower wheel speed sensors $1_L$ and $1_R$, the driving wheel speed sensors $2_L$ and $2_R$, the brake switch 4, the wiper switch 6 and a buzzer 10 for giving an alarm upon generation of a hydroplaning condition are all connected to an electronic control unit U comprising a micro-computer.

Figure 2:
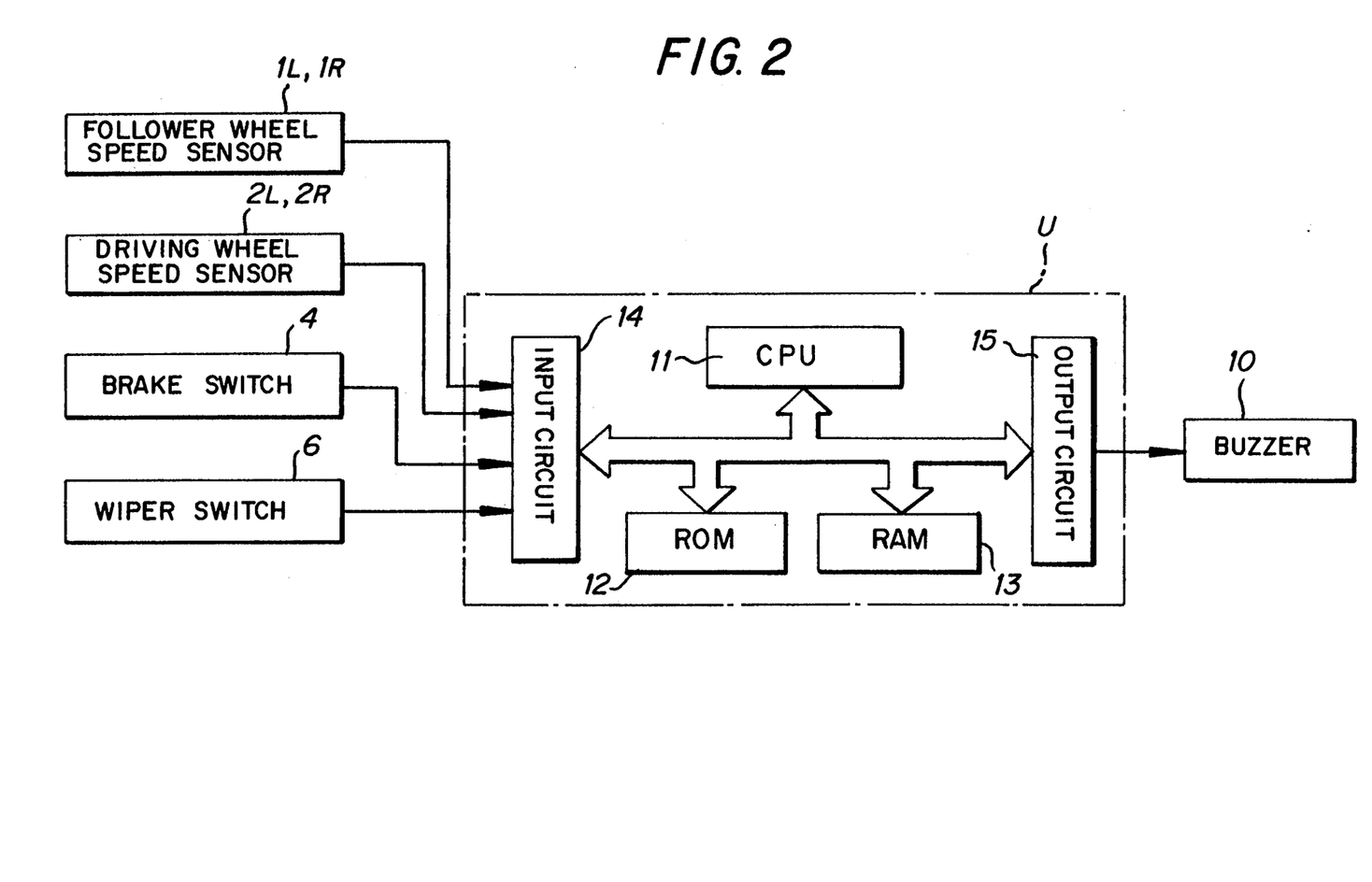
FIG. 2 is a diagram of a circuit arrangement of an electronic control unit in the hydroplaning detecting system.

As shown in FIG. 2, the electronic control unit U is comprised of a CPU 11 capable of rapid arithmetic operation, a ROM 12 in which an arithmetic operating program and various data have been previously stored, a RAM 13 in which detection values and results of arithmetic operations or calculations are temporarily stored, an input circuit 14 to which the follower wheel speed sensors $1_L$ and $1_R$, the driving wheel speed sensors $2_L$ and $2_R$, the brake switch 4 and the wiper switch 6 are connected, and an output circuit 15 to which the buzzer 10 is connected.

Figure 3:
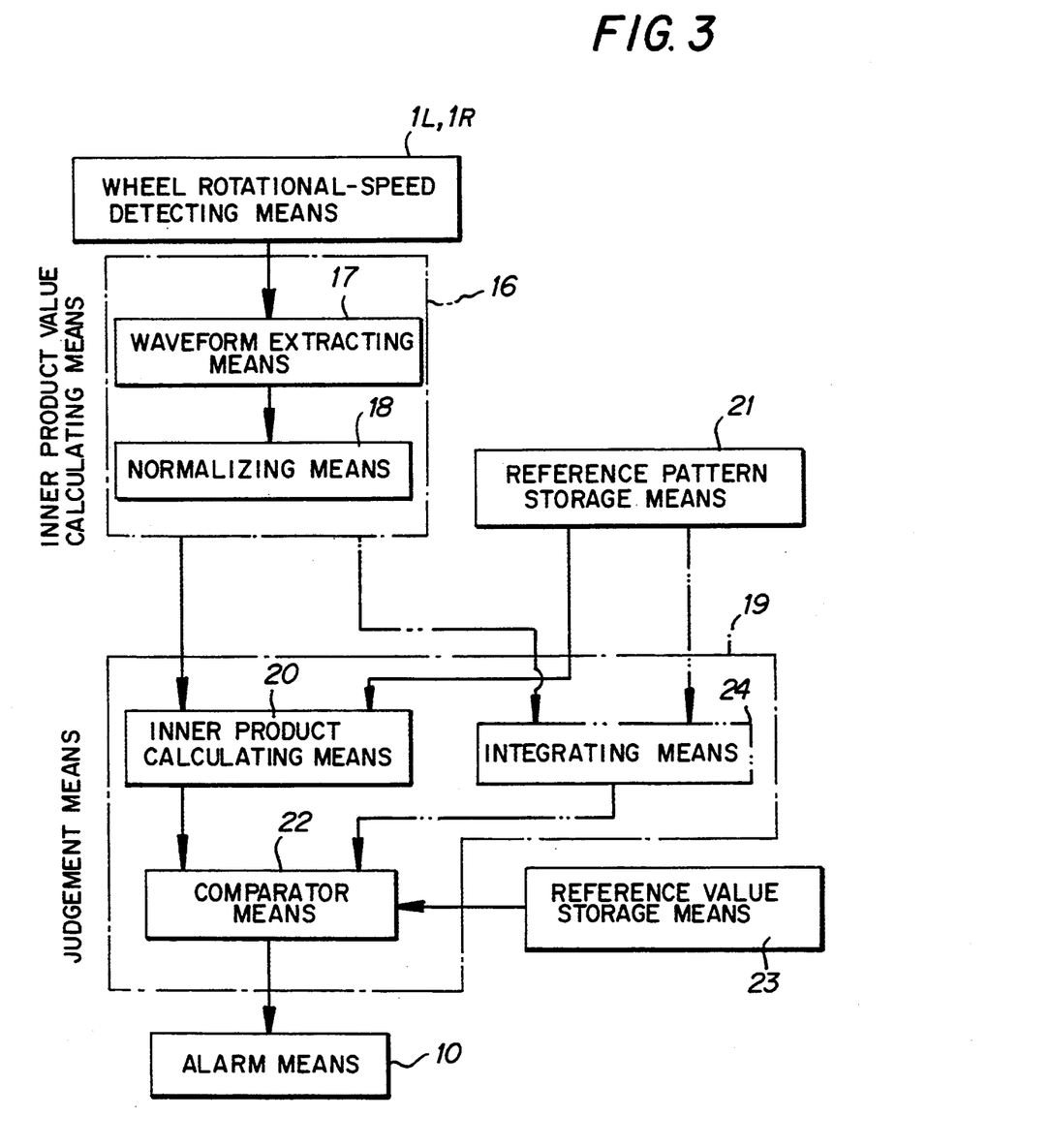
FIG. 3 is a block diagram illustrating a content of processing by the electronic control unit.

FIG. 3 is a block diagram illustrating processing operations executed in the electronic control unit U. Follower wheel speeds detected by the wheel rotational-speed detecting means $1_L$ and $1_R$ are received into an actual variation pattern extracting means 16. A characteristic portion of a waveform of such variation in speed is extracted in a waveform extracting means 17 and then normalized in a normalizing means 18. The waveform of the variation in speed detected by the wheel rotational-speed detecting means $1_L$ and $1_R$ includes a portion due to a hydroplaning and portions due to other causes as shown in FIGS. 6A to 6D. A reference pattern (see FIG. 6E) stored in a reference pattern storage means 21, i.e., a variation pattern of the follower wheel speed typically resulting from the generation of light hydroplaning and an actual variation pattern normalized in the normalizing means 18 are received into an inner product calculating means 20 in a judgment means 19, where an inner product value between the actual variation pattern and the reference pattern is calculated. This inner product value serves as a parameter for a degree of matching between the actual variation pattern and the reference pattern. In a comparator means 22, the inner product value is compared with a reference value previously stored in a reference value storage means 23. If the inner product value exceeds the reference value, i.e., if the matching degree is high as a result of a pattern matching between the actual variation pattern and the reference pattern, it is decided that the hydroplaning has been generated, and an alarm is given to a driver by the alarm means 10. Here, the wheel rotational-speed detecting means correspond to the follower speed sensors $1_L$ and $1_R$, and the alarm means corresponds to the buzzer 10. The actual variation pattern extracting means 16 and the judgment means 19 are comprised of CPU 11 and RAM 13, and the reference pattern storage means 21 and the reference value storage means 23 are comprised of ROM 12.

Figure 4:
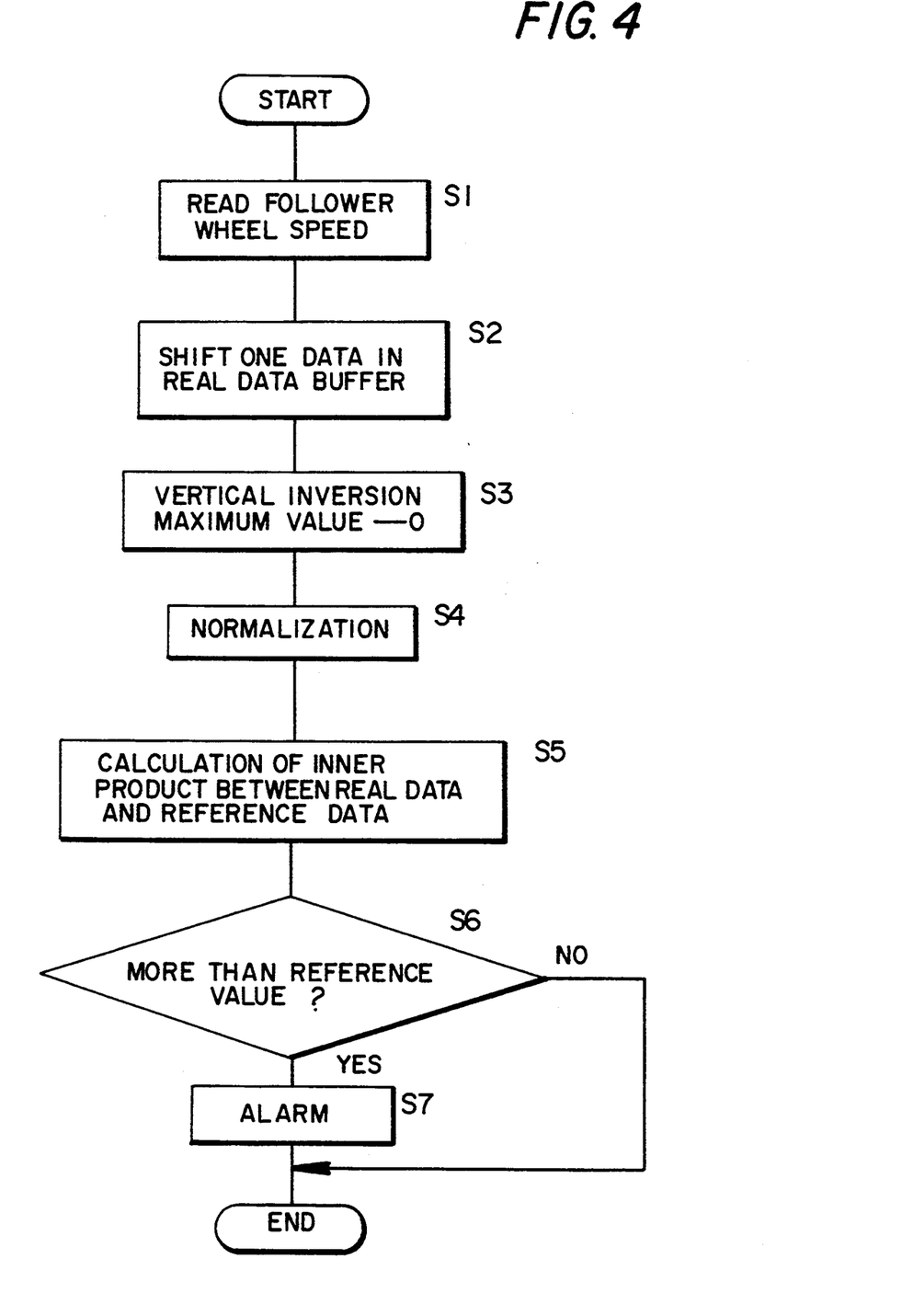
FIG. 4 is a flow chart for detecting a hydroplaning.

The processing operations executed in the electronic control unit U will be described below in detail with reference to a flow chart in FIG. 4 and operation-explaining diagrams in FIGS. 7A to 7E.

Step S1

Figure 7A:
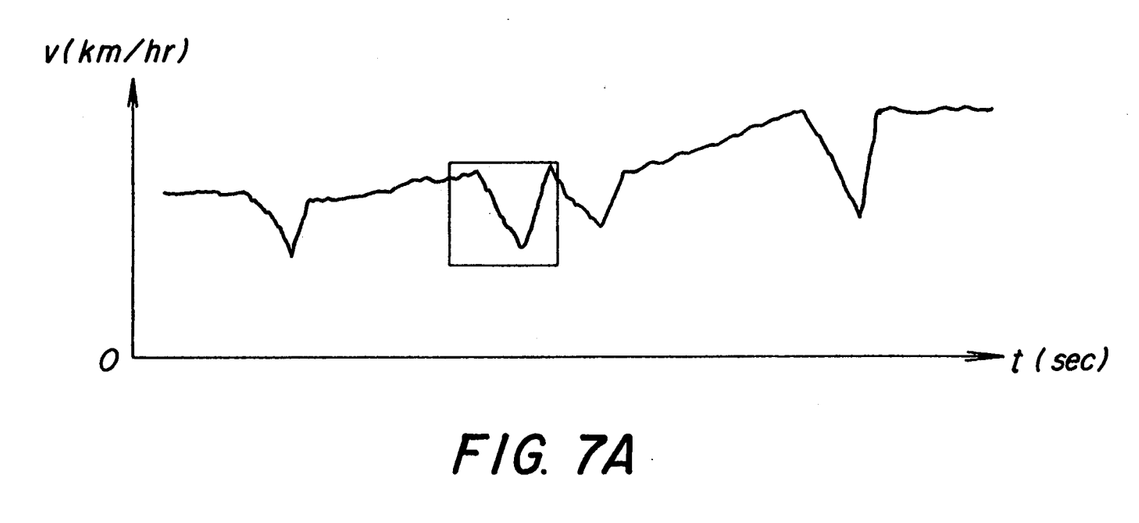
FIGS. 7A to 7E are diagrams for explaining the operation.

The follower wheel speeds detected by the follower wheel speed sensors $1_L$ and $1_R$ are read in by the electronic control unit U at predetermined intervals of time (at intervals of some tens of milliseconds) (see FIG. 7A).

Step S2

An n number of read-in data $V_1, V_2, V_3, \ldots, V_n$ are accumulated in a fresh datum buffer, and every time new data is read in, each of the accumulated data is shifted to the next buffer, respectively.

Step S3

Figure 7B:
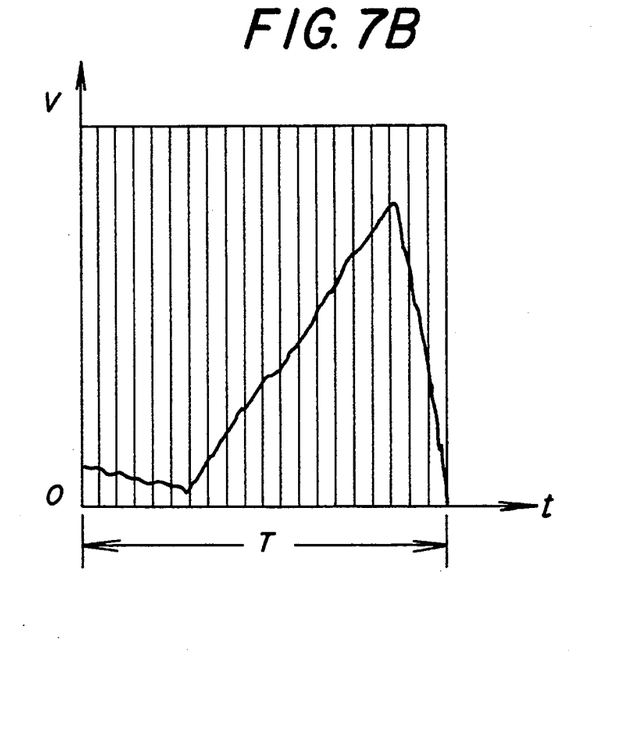

The sampled data accumulated in the fresh data buffer are vertically inverted, so that their maximum value becomes zero (0) (see FIG. 7B).

Step S4

Figure 7C:
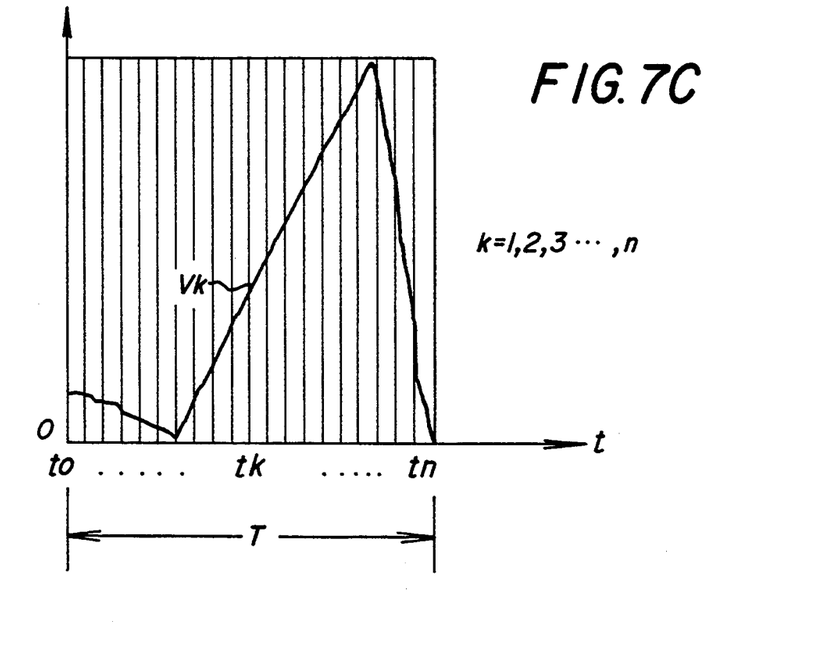
Figure 7D:
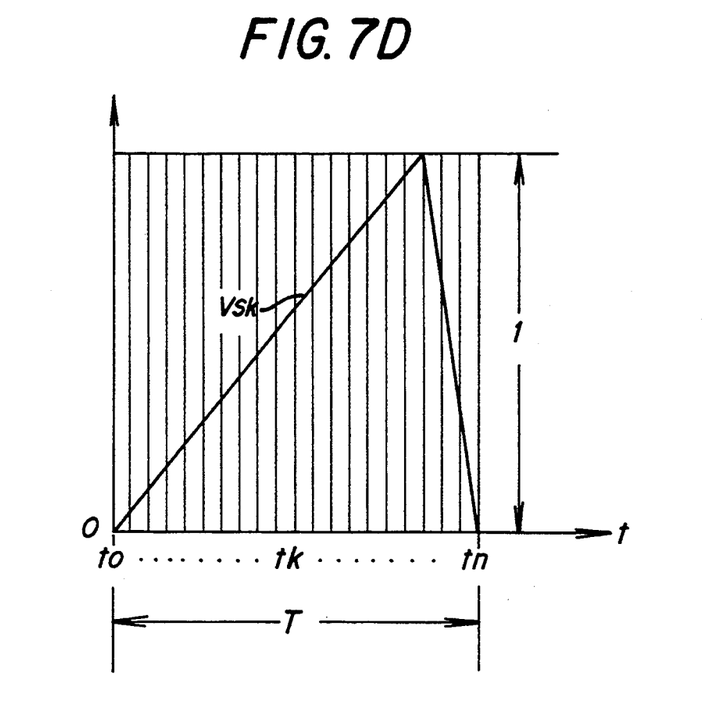
Figure 7E:
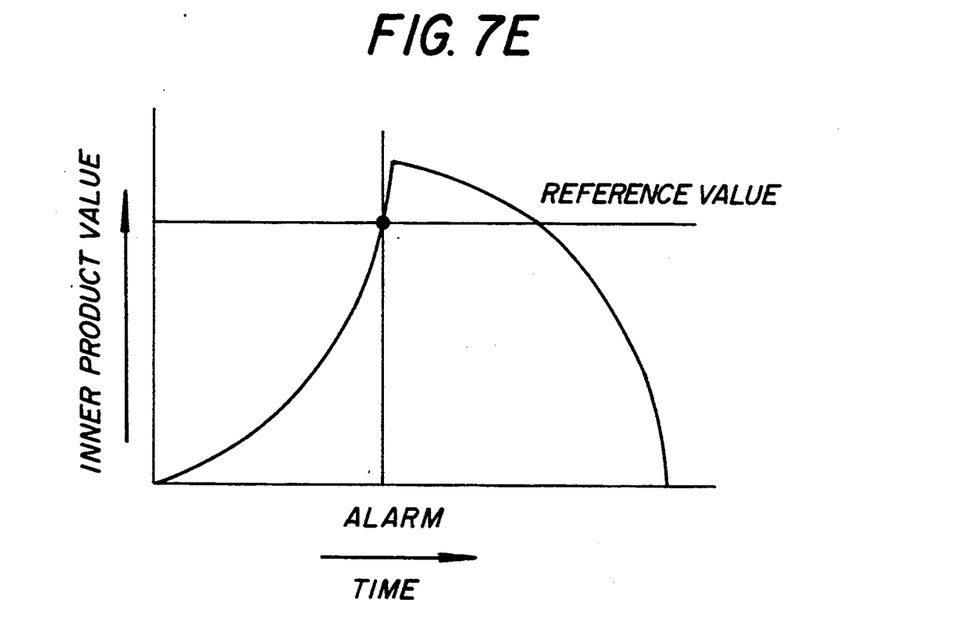

The maximum value of the vertically inverted fresh data is normalized on the basis of the maximum value of the reference pattern (see FIG. 7C). More specifically, the maximum value of the fresh data after being inverted (the minimum value of the fresh data before being inverted) is normalized so that the maximum reference pattern value becomes 1 (see FIG. 7D), and the resulting actual data $V_1, V_2, V_3, \ldots, V_n$, are accumulated in an actual data buffer. The reference pattern used herein has been previously set at a scale of a waveform for the follower wheel speed in the event light hydroplaning has been generated.

Step S5

An inner product value between the reference data $V_{S1}, V_{S2}, V_{S3}, \ldots, V_{Sn}$ corresponding to the reference pattern and the actual data $V_1, V_2, V_3, \ldots, V_n$ are calculated. More specifically, the reference data and the actual data are taken as two vectors having an n number of components, respectively, and $V_{S1} \times V_1 + V_{S2} \times V_2 + V_{S3} \times V_3 + \ldots + V_{Sn} \times V_n$, which is an inner product value between both the vectors, is calculated. In general, an inner product value between two vectors is the maximum, when these two vectors match with each other, and the inner product value is decreased, as the matching degree between both the vectors is reduced. Therefore, by using such an inner product value as a parameter, it can be decided that the pattern of variation in follower wheel speed actually detected well matches with the pattern of variation in follower wheel speed in the event when hydroplaning has been generated, if the inner product value is larger. Conversely, if the inner product value is smaller it can be decided that both of the above-described patterns do not match each other.

Step S6

The inner product value determined in Step S5 is compared with the previously set reference value. If such inner product value exceeds the reference value, it is decided that hydroplaning has been generated (see FIG. 7E).

Step S7

When the generation of hydroplaning is detected, the buzzer 10 is operated to give an alarm to the driver. This enables the driver to know that a road surface is in a condition in which hydroplaning is liable to be generated, thereby reducing the travel speed of the vehicle.

It should be noted that the follower wheel speeds detected by the left and right follower speed sensors $1_L$ and $1_R$ are independently processed, and if an inner product value derived from either one of such follower wheel speeds exceeds the reference value, it is decided that hydroplaning has been generated, and the alarm is given.

In order to increase the accuracy of detection of the hydroplaning, the vehicle speed, the raining condition and the braking condition can all be taken into consideration. More specifically, the construction may be such that if the vehicle speed determined from the left and right driving wheel speeds detected by the left and right driving wheel speed sensors $2_L$ and $2_R$ is lower than a reference value (e.g., 60 km/hr), the alarm need not be given irrespective of the magnitude of the inner product value, because there is no possibility of generation of hydroplaning. In addition, even during a non-raining condition in which the wiper switch 6 is OFF, the alarm need not be given irrespective of the magnitude of the inner product value, from the decision that there is no possibility of generation of hydroplaning. Further, because a large deceleration is detected during braking, there is a possibility of a false detection of hydroplaning generation, thereby causing sounding of the alarm. However, because the brake switch 4 is OFF during the braking, the OFF state of the brake switch 4 may be detected to give no alarm.

A second embodiment of the present invention will now be described. The second embodiment features substitution of the inner product calculating means 20 in the first embodiment with an integrating means 24, as shown in FIG. 3, with the remaining arrangement being the same as in the first embodiment.

The integrating means 24 is a means for performing a pattern matching between the actual variation pattern and the reference pattern as in the above-described inner product calculating means 20, and the content of the pattern matching will be described below in detail.

Figure 8A:
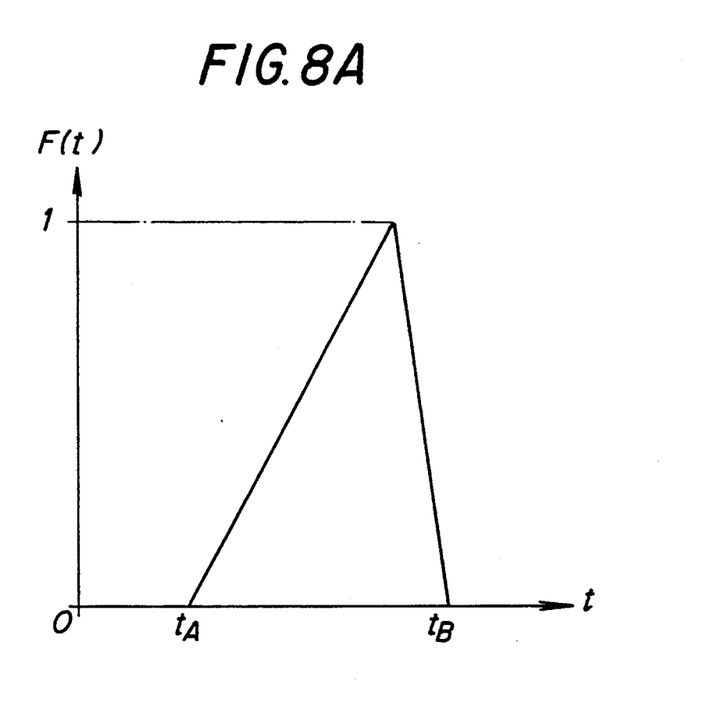
FIGS. 8A to 8D are diagrams for explaining the convolution integration according to a second embodiment.
Figure 8B:
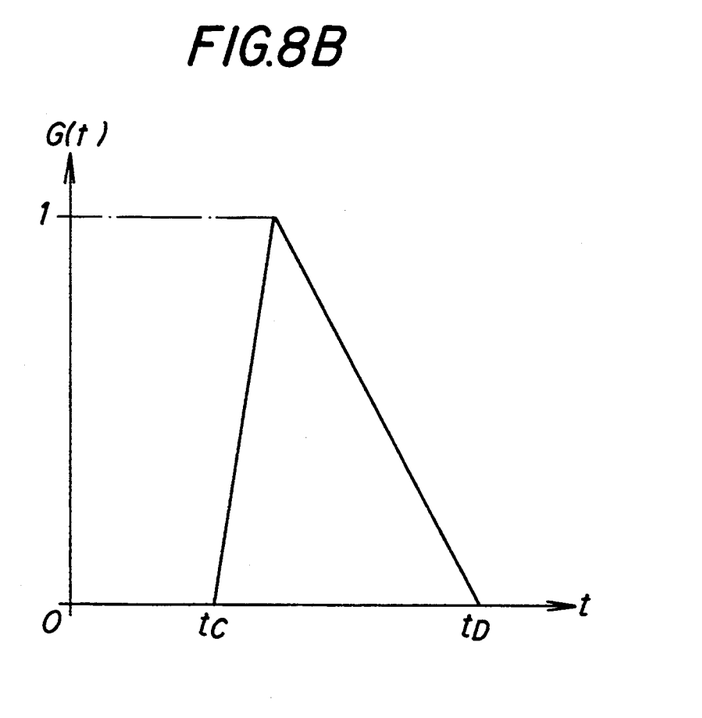

The integrating means 24 calculates a convolution integration between a function F(t) representing the actual variation pattern and a function G(t) representing the reference pattern. Here, the convolution integration F(t)*(Gt) is defined to be represented by the following expression:

$$F(t) * G(t) = \int_{-\infty}^{\infty} F(\tau - t) \times G(t) d\tau \quad (1)$$

wherein the function F(t) representing the actual variation pattern corresponds to a pattern resulting from the vertical inversion and normalization of the fresh data of the follower wheel speed, as shown in FIG. 8A, and the function G(t) representing the reference pattern corresponds to a pattern resulting from the vertical and lateral inversions of the reference pattern, as shown in FIG. 8B.

Figure 8C:
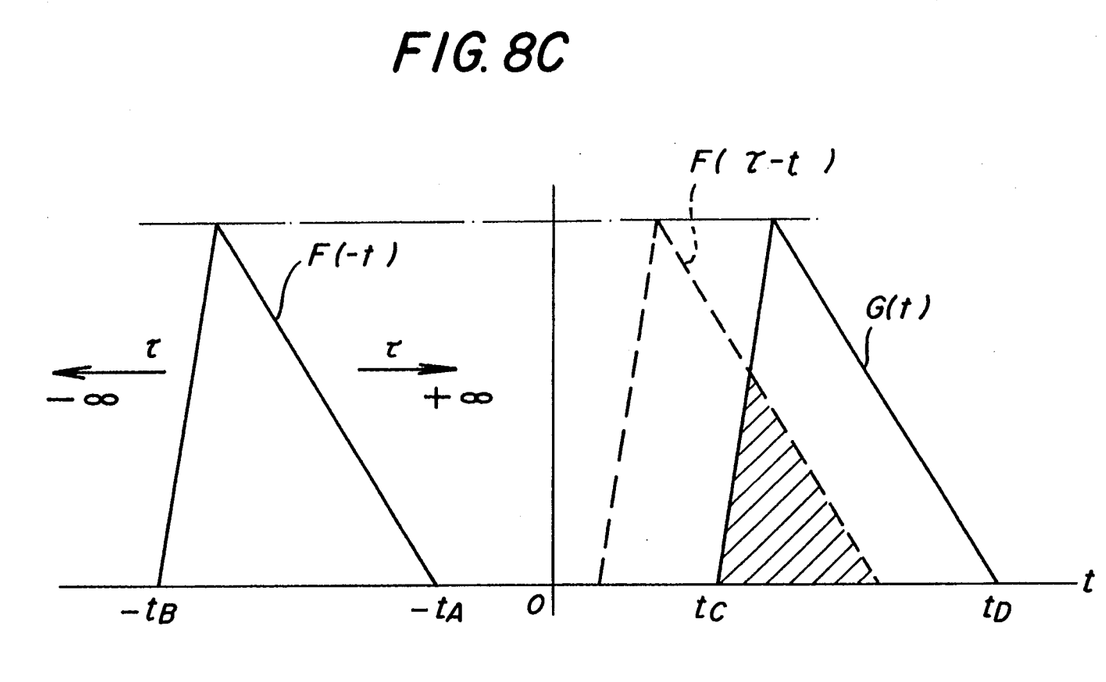

As shown in FIG. 8C, the function $F(\tau-t)$ in the expression (1) corresponds to a pattern resulting form the inversion of the function F(t) representing the actual variation pattern with respect to the axis of ordinates, followed by the parallel displacement by $\tau$ along the axis of abscisses. Thus, if $\tau$ is varied from $-\infty$ to $+\infty$, the function $F(\tau-t)$ is displaced along the axis of abscisses, and in the course of such displacement, the function $F(\tau-t)$ and the function G(t) are superimposed on each other in a range represented by $t_A + t_C \leq \tau \leq t_B + t_D$. Thus, the area of an obliquely lined region on which both the functions $F(\tau-t)$ and G(t) are superimposed is proportional to the value of the convolution integration F(t)*G(t) defined in the expression (1).

Figure 8D:
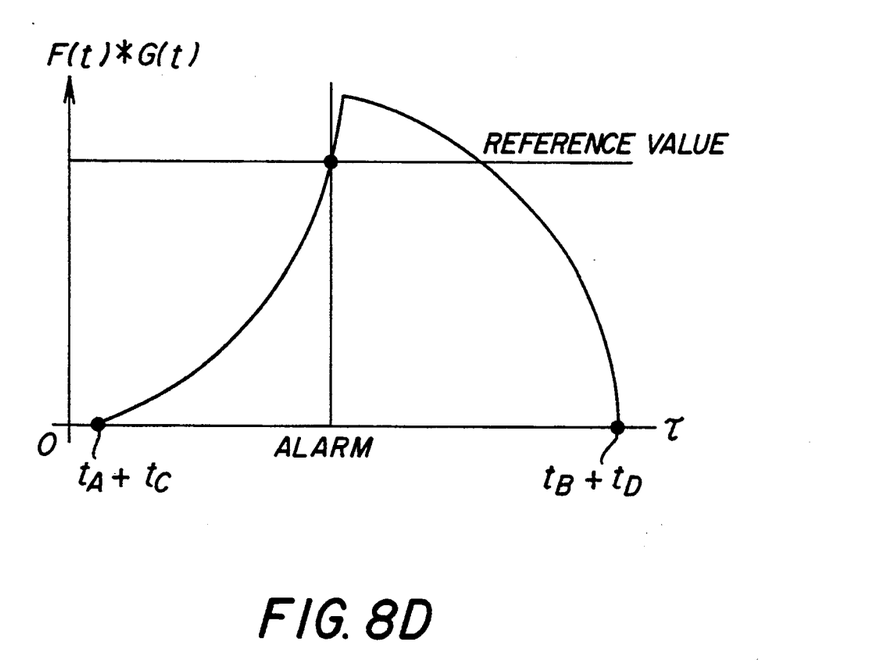

The area of the superimposed region is gradually increased with the displacement of the function $F(\tau-t)$, as shown in FIG. 8D, and decreased again after the maximum is reached. The maximum value of the area of the superimposed region is increased, as the matching degree between the patterns of the functions $F(\tau-t)$ and G(t) becomes higher. Therefore, using the value of the convolution integration F(t)*G(t) as a parameter representing the matching degree between the actual variation pattern and the reference pattern, it can be decided that hydroplaning has been generated, if such value of the convolution integration F(t)*G(t) exceeds the predetermined reference value.

It is possible to employ, in combination, in addition to the alarm provided by the buzzer, an automatic cancel of an auto-cruising device and/or a throttle valve closing control in an electric throttle control system. In place of the CPU, the calculation of the inner product value and the integrated value may be carried out in an exclusive high-speed filter arithmetic device. Further, it is possible to vary the reference pattern for the hydroplaning in accordance with the vehicle speed.

It should be noted that the present invention is applicable not only to the rear wheel drive vehicle, as described in the embodiments, but also to a front wheel drive vehicle for detecting the hydroplaning phenomenon. Even in such a case, it is preferable to use the front wheels for detecting the hydroplaning phenomenon.

In the front wheel drive vehicle, the front wheels are the driving wheels and, thus, the driving force is applied to the front wheels. In such a case, when the hydroplaning phenomenon is generated, the front wheel speed may not only be decreased as in the rear drive vehicle, but may also be increased, depending on the magnitude of the driving force. Therefore, when applying the present invention to the front wheel drive vehicle after extracting the variation pattern by the actual variation pattern extracting means, the extracted pattern should be vertically inverted, i.e., the pattern should be converted to an absolute value. With such an arrangement, the hydroplaning phenomenon can be detected even when the front wheel speed is increased.

Although the embodiments of the present invention have been described in detail, it will be understood that the present invention is not limited, and various minor modifications and variations can be made without departing from the spirit and scope of the present invention defined in claims.

What is claimed is:

1. A hydroplaning detecting system comprising:
   wheel rotational speed detecting means for detecting a wheel rotational speed of a wheel of a vehicle;
   reference pattern storage means for previously storing a reference pattern of the wheel rotational speed which varies over a period of time and is characteristic of hydroplaning generation;
   actual variation pattern extracting means for extracting an actual variation in the wheel rotational speed over a period of time; and
   judgment means for judging the matching between said reference pattern and said actual variation pattern, and for producing an output signal when matching is detected, to indicate occurrence of hydroplaning.

2. A hydroplaning detecting system according to claim 1, wherein said judgment means includes inner product calculating means for calculating an inner product between said reference pattern and said actual variation pattern, and comparator means for comparing the calculated inner product with a reference value previously stored in a reference value storage means.

3. A hydroplaning detecting system according to claim 1, wherein said judgment means includes convolution integrating means for conducting a convolution integration between said reference pattern and said actual variation pattern, and comparator means for comparing the integrated value with a reference value previously stored in a reference value storage means.

4. A hydroplaning detecting system according to claim 1, wherein said actual variation pattern extracting means includes waveform extracting means for extracting the waveform of a actual variation in detected wheel rotational speed, and normalizing means for mormalizing a high value of a speed-reduction peak wave in the extracted waveform by a high value of a speed-reduction peak wave of said reference pattern.

5. A hydroplaning detecting system according to claim 1, wherein said system further comprises alarm means for giving an alarm for the generation of hydroplaning on the basis of an output from the judgment means.

6. A hydroplaning detecting system according to claim 1, wherein in the case where driving wheels are used for the detection of hydroplaning, the system further comprises a means for vertically inverting said actual variation in the wheel rotational speed such that absolute values of changes in speed are used in said judgment means for judging the matching between said reference pattern and said actual variation pattern.

7. A hydroplaning detecting system according to claim 2, wherein said system further comprises alarm means for giving an alarm for the generation of hydroplaning on the basis of an output of the judgment means, wherein said alarm means is disabled if the wheel rotational speed is lower than said reference value previously stored in said reference value storage means.

8. A hydroplaning detecting system according to claim 3, wherein said system further comprises alarm means for giving an alarm for the generation of hydroplaning on the basis of an output of the judgment means, wherein said alarm means is disabled if the wheel rotational speed is lower than said reference value previously stored in said reference value storage means.

9. A hydroplaning detecting system according to claim 5, further comprising a wiper switch for controlling operation of windshield wipers wherein said alarm is disabled if said wiper switch is off.

10. A hydroplaning detecting system according to claim 5, further comprising a brake switch for controlling braking operations of said wheel wherein said alarm is disabled if said brake switch is off.

11. A hydroplaning detecting system comprising:
    wheel rotational speed detecting means for detecting a wheel rotational speed of a wheel of a vehicle;
    a reference pattern storage means for storing a reference variation pattern of the wheel rotational speed which is characteristic of hydroplaning generation;
    actual variation pattern extracting means for extracting an actual variation pattern in the wheel rotational speed over a period of time; and
    judging means for judging a matching between said reference variation pattern and said actual variation pattern by using an inner product between the patterns, and for producing an output signal indicative of hydroplaning generation when the matching is detected.

12. A hydroplaning system according to claim 11, wherein said reference variation pattern includes a pair of descending portion and ascending portion.

13. A hydroplaning system comprising:
    wheel rotational speed detecting means for detecting a wheel rotational speed of a wheel of a vehicle;
    a reference pattern storage means for storing a reference variation pattern of the wheel rotational speed which is characteristic of hydroplaning generation;
    actual variation pattern extracting means for extracting an actual variation pattern in the wheel rotational speed over a period of time; and
    judging means for judging a matching between said reference variation pattern and said actual variation pattern by using a convolution integration between the patterns, and for producing an output signal indicative of hydroplaning generation when the matching is detected.

14. A hydroplaning detecting system according to claim 13, wherein said reference variation pattern includes a pair of descending portion and ascending portion.

* * * * *